Jan. 31, 1939.  H. PAXTON  2,145,495
METHOD OF AND APPARATUS FOR REMOVING EXCESS SURFACE WATER FROM FRESH FRUIT
Filed Jan. 4, 1935
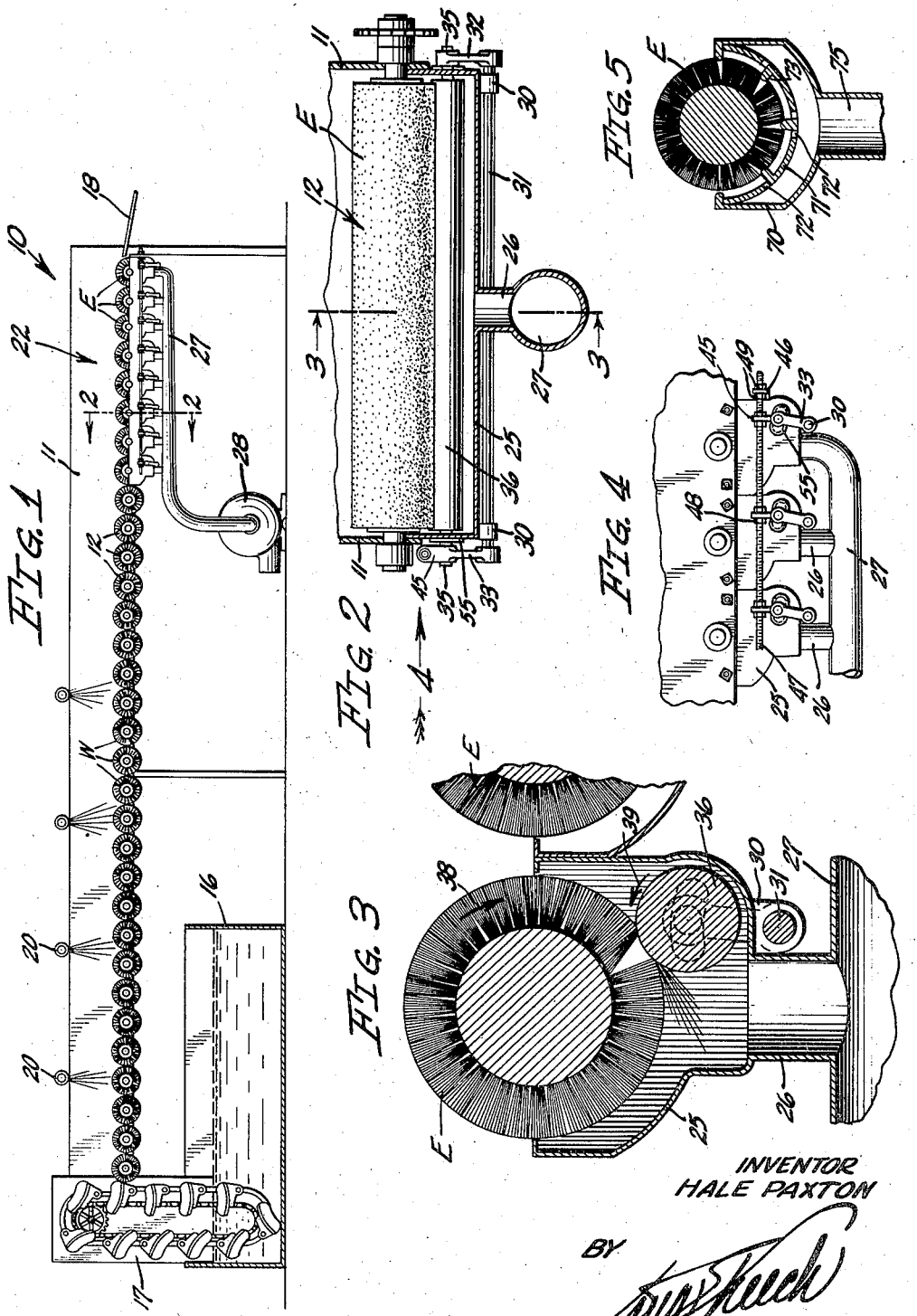
INVENTOR
HALE PAXTON
BY
ATTORNEY Patented Jan. 31, 1939

2,145,495

UNITED STATES PATENT OFFICE 2,145,495

METHOD OF AND APPARATUS FOR REMOVING EXCESS SURFACE WATER FROM FRESH FRUIT

Hale Paxton, Santa Ana, Calif., assignor, by mesne assignments, to Food Machinery Corporation, a corporation of Delaware Application January 4, 1935, Serial No. 391

27 Claims. (Cl. 34—1)

This invention relates to apparatus used in the commercial preparation of citrus and other similarly rollable fruits and vegetables for shipment to market, and particularly to apparatus for washing such fruit and then removing the greater portion of the moisture adhering to the outer surface of the fruit.

In a considerable portion of the citrus packing houses in California and Florida the equipment at present in use for washing and drying citrus fruit prior to sorting, grading, sizing, and packing this comprises a transverse brusher used wet as a washer, a water eliminator of some kind or other, and a transverse brusher used as a drier, the fruit travelling over these machines consecutively in the order named.

When the aforementioned apparatus is assembled in the usual manner it has an excessive length which is extremely difficult to fit into the average sized packing house.

It is accordingly an object of my invention to provide apparatus for a combined washer and water eliminator which will be considerably shorter than the present apparatus required for performing these functions.

The eliminating of excess water from the fruit after it has been washed is at present a considerable problem, and the types of equipment now provided for this purpose are all expensive as well as taking up considerable space in the packing house.

It is therefore a further object of my invention to provide a water eliminator which occupies a relatively small space and is inexpensive in first cost and upkeep.

It is a still further object of my invention to provide a water eliminator which can be combined with any transverse brusher, washer, or drier, by the addition thereto of relatively few inexpensive parts.

The manner of accomplishing the foregoing objects as well as further objects and advantages will be made manifest in the following description taken in connection with the accompanying drawing, in which:

Fig. 1 is a diagrammatic longitudinal sectional view taken through a preferred embodiment of the combined washer and water eliminator of my invention.

Fig. 2 is an enlarged transverse sectional view taken on the line 2—2 of Fig. 1.

Fig. 3 is a still further enlarged longitudinal sectional view taken on the line 3—3 of Fig. 2.

Fig. 4 is a fragmentary side elevational view taken in the direction of the arrow 4 of Fig. 2, Fig. 5 is a diagrammatic cross sectional view of the combined washer and water eliminator illustrating a modified form of my invention.

Referring specifically to the drawing the preferred embodiment of my invention shown in Figs. 1 to 4 inclusive is indicated by the numeral 10. This includes a frame 11 on which is rotatably journalled a plurality of cylindrical brushes 12, these all being disposed parallel with each other and in a substantially horizontal plane to provide a supporting apron for fruit to be washed and partially dried by this apparatus.

Disposed beneath the brushes 12 at one end of the apparatus 10 is a soaking tank 16 into the right end of which the operator dumps fruit which is destined to pass through the apparatus 10. Disposed at the left-hand end of the apparatus 10 and extending downwardly into left-hand end of the tank 16 is an elevator 17 which operates continuously to lift fruit from the water in the tank 16 and discharge this on the left-hand end of the apron of brushes 12 when the machine is running. The brushes 12 all rotate in the same direction so that upwardly disposed portions of the peripheries thereof all travel from the left towards the right.

At the right-hand end of the apparatus 10 is a drop board 18 over which fruit is adapted to be discharged from the machine. The continuing delivery of fruit by the elevator 17 onto the left-hand end of the apron of brushes 12 causes that previously fed to be pushed forward thus resulting in a progression of fruit over all the brushes and a discharge of this finally over the drop board 18. The apparatus 10 is preferably hooked up with a drier which receives the fruit from the drop board 18 and completely dries the fruit. Inasmuch as the size and cost of these driers is proportionate to the amount of water on the fruit, which must be removed from it after its leaving the apparatus 10, it is highly desirable to have the fruit just as dry as possible when it is discharged from this apparatus.

The first function of the apparatus 10 of course is to wash the fruit as this rests upon the brushes 12. To facilitate this, water is sprayed on the fruit from pipes 20 as the fruit passes over the brushes.

In order to dry the fruit as much as possible before it passes out of the apparatus 10 it is to be noted that no water is sprayed from the pipes 20 on the fruit after this approaches the right end portion of the apparatus. Also it is noted that the last eight brushes in the apparatus are included in an eliminator unit 22, these brushes being specifically referred to hereinafter as eliminator brushes E whereas the other brushes 12 will be referred to as washer brushes W.

As shown in Figs. 2, 3, and 4 each of the brushes E has a pan 25 surrounding the lower portion thereof. These pans are connected by necks 26 to a suction pipe 27 leading to the suction end of a fan blower 28. Pivotally journalled in bearings 30 provided on each of the pans 25 is a shaft 31 having arms 32 and 33 fixed to the opposite ends thereof. The upper ends of the arms 32 and 33 are provided with suitable bearings for trunnions 35 which extend through suitable apertures in the pans 25 and which are mounted upon rollers 36 disposed in these pans. The roller 36 in each pan 25 is disposed in contact with the brush E in that pan as clearly shown in Figs. 2 and 3. Rotation of the brush E in the direction of the arrow 38 as shown in Fig. 3 causes a rotation of the roller 36 in the direction of the arrow 39. This results in flipping the bristles of the brush and the throwing of water therefrom. A portion of this water collects on the surface of the roller 36 and is thrown therefrom as shown in this view.

Means for adjustably determining the positions of the roller 36 relative to the brushes E includes apertured lugs 45 extending upward from the arms 33 and a lug 46 formed on the endmost one of the pans 25, a threaded rod 47 which extends through the apertured lugs 45 and 46, and nuts 48 and 49 which are disposed on opposite sides of the lugs 45 and 46 respectively. Suitable flaps 55 extend around each of the trunnions 35 and cover the openings in the pan 25 through which these trunnions extend.

By manipulation of the nuts 49 on the rod 47 the rollers 36 may be simultaneously adjusted relative to their respective brushes E. Manipulation of any given pair of the nuts 48 which governs the position of a single roller 36 will permit the individual adjustment of that roller relative to the particular brush E associated therewith.

*Operation*

The apparatus 10 is used in exactly the same manner as any transverse washer excepting that the need for the usual water eliminator in between the washer and the drier is obviated by the presence of the water eliminating unit 22 in the apparatus 10. It is clear of course that the brushes E not only continue the washing function started by the brushes W but remove a major portion of the loose water present on the surface of the fruit when it enters the water eliminating unit 22. While the unit 22 is preferably formed integrally with the washer it is to be understood that it is within the scope of the invention to place the unit 22 at the beginning of the drier if this should be desired. If this were done however the presence of a considerable amount of water on the brushes E would still cause these to perform a substantial degree of cleansing or washing of the fruit concurrently with the removal of the excess moisture from the fruit.

The physical action of the roller 36 in removing the excess water collected at the periphery of the bristles of the brush E is augmented by the drying action of the air sucked downwardly between the pan 25 and the brushes E by the operation of the blower 28. This aids substantially in drying the brushes E so that by the time the fruit reaches the right hand end of the water eliminator unit 22 the brushes are practically free of water beyond a very thin layer covering the individual bristles.

Referring now to Fig. 5 I have here shown a modified form of my invention which includes a pan 70 extending around the lower portions of the brushes E each of these pans having a false bottom 71 which has perforations 72 and carries bristle flipping beads 73 which engage the bristles on the brush and flip water from these so that this may be sucked from the pan 70 through a neck 75 in a similar manner heretofore described for the preferred embodiment.

What I claim is:

1. In an apparatus for conveying, brushing and removing excess surface water from fruit the combination of: a plurality of parallel rotatable brushes mounted transversely of the path to be followed by the fruit, said brushes forming a supporting apron for said fruit; means for rotating said brushes with the upper faces thereof travelling in a given direction from the fruit receiving end to the fruit discharging end of said apron; and means for engaging, temporarily deflecting, and releasing the bristles of said brushes, thereby mechanically removing water from said brushes while said fruit is resting thereon and while said brushes are rotating.

2. In an apparatus for removing excess surface water from fruit the combination of: a plurality of parallel rotatable brushes mounted transversely of the path to be followed by the fruit, said brushes forming a supporting apron for said fruit; means for rotating said brushes with the upper faces thereof travelling in a given direction from the fruit receiving end to the fruit discharging end of said apron; and means for causing water to be whipped from the bristles of said brushes so as to discharge water from said bristles when the latter are disposed beneath the level of the axes of said brushes by intermittently engaging and interrupting the peripheral movement of said bristles.

3. In an apparatus for brushing and eliminating the excess moisture from wet fresh fruit, the combination of: a plurality of parallel cylindrical brushes mounted transversely of the path to be followed by the fruit, said brushes forming a supporting apron for said fruit; means for rotating said brushes with the upper faces thereof travelling in a given direction from the fruit receiving end to the fruit discharging end of said apron; and rotatable members one of which is disposed parallel with and in contact with the bristles of each of said brushes.

4. A combination as in claim 3 in which said members are cylindrical and freely rotatable by said contact with said brushes.

5. A combination as in claim 3 in which said members are substantially cylindrical; and means for selectively positioning each of said members as to its spacing from the brush with which it is in contact.

6. A combination as in claim 3 in which said members are substantially cylindrical; and means for selectively positioning each of said members individually as to its spacing from the brush with which it is in contact; and means for simultaneously selectively positioning all of said members as aforesaid.

7. A method of conveying and scrubbing fresh whole fruit and simultaneously therewith removing free moisture adhering to the exterior surfaces of such fruit, all by a group of cylindrical brushes which comprises arranging said brushes in closely spaced parallelism in a single substantially horizontal plane, rotating said brushes rapidly in the same direction, feeding wet fruit onto said brushes to cause said fruit to be supported on said brushes and progress thereover in the direction in which upper portions of the peripheries of said brushes travel, momentarily retarding peripheral movement of the bristles of certain of said brushes and then releasing said bristles to flip water from said bristles.

8. A method of conveying and scrubbing fresh whole fruit and simultaneously therewith removing free moisture adhering to the exterior surfaces of such fruit, all by a group of cylindrical brushes which comprises arranging said brushes in closely spaced parallelism in a single substantially horizontal plane, rotating said brushes rapidly in the same direction, feeding wet fruit onto said brushes to cause said fruit to be supported on said brushes and progress thereover in the direction in which upper portions of the peripheries of said brushes travel, momentarily retarding peripheral movement of the bristles of certain of said brushes when said bristles are disposed downwardly and then releasing said bristles to flip water from said bristles.

9. A method of conveying and scrubbing fresh whole fruit and simultaneously therewith removing free moisture adhering to the exterior surfaces of such fruit, all by a group of cylindrical brushes which comprises arranging said brushes in closely spaced parallelism in a single substantially horizontal plane, rotating said brushes rapidly in the same direction, feeding wet fruit onto said brushes to cause said fruit to be supported on said brushes and progress thereover in the direction in which upper portions of the peripheries of said brushes travel, momentarily retarding peripheral movement of the bristles of certain of said brushes when said bristles are disposed downwardly and then releasing said bristles to flip water downwardly from said bristles.

10. A method of conveying and scrubbing fresh whole fruit and simultaneously therewith removing free moisture adhering to the exterior surfaces of such fruit, all by a group of cylindrical brushes which comprises arranging said brushes in closely spaced parallelism in a single substantially horizontal plane, rotating said brushes rapidly in the same direction, feeding wet fruit onto said brushes to cause said fruit to be supported on said brushes and progress thereover in the direction in which upper portions of the peripheries of said brushes travel, rapidly evacuating air from the space immediately adjacent to the lower portions of said brushes, momentarily retarding peripheral movement of the bristles of said brushes when said bristles are disposed downwardly and then releasing said bristles to flip water from said bristles.

11. In an apparatus for conveying, brushing and removing excess surface water from fruit the combination of: a plurality of parallel rotatable brushes mounted transversely of the path to be followed by the fruit, said brushes forming a supporting apron for said fruit; means for rotating said brushes with the upper faces thereof travelling in a given direction from the fruit receiving end to the fruit discharging end of said apron; bristle retarding members disposed adjacent certain of said brushes and extending into the paths of the bristles thereof; and means for varying the distances which said members extend into the paths of said bristles.

12. In an apparatus for conveying, brushing and removing excess surface water from fruit the combination of: a plurality of parallel rotatable brushes mounted transversely of the path to be followed by the fruit, said brushes forming a supporting apron for said fruit; means for rotating said brushes with the upper faces thereof travelling in a given direction from the fruit receiving end to the fruit discharging end of said apron; bristle retarding members disposed adjacent certain of said brushes and extending into the paths of the bristles thereof; and means for individually or collectively shifting said members to vary the distances which said members extend into the paths of said bristles.

13. In an apparatus for conveying, brushing and removing excess surface water from fruit the combination of: a plurality of parallel rotatable brushes mounted transversely of the path to be followed by the fruit, said brushes forming a supporting apron for said fruit; means for rotating said brushes with the upper faces thereof travelling in a given direction from the fruit receiving end to the fruit discharging end of said apron; means forming a housing extending closely around the lower portions of said brushes; and means for sucking the air rapidly from said housing to create a substantially subatmospheric pressure in said housing.

14. In an apparatus for conveying, brushing and removing excess surface water from fruit the combination of: a plurality of parallel rotatable brushes mounted transversely of the path to be followed by the fruit, said brushes forming a supporting apron for said fruit; means for rotating said brushes with the upper faces thereof travelling in a given direction from the fruit receiving end of said apron to the fruit discharging end thereof; and a plurality of bristle retarding members extending into the pathway of peripheral portions of the bristles of each of certain of the said brushes.

15. In an apparatus for conveying, brushing and removing excess surface water from fruit the combination of: a plurality of parallel rotatable brushes mounted transversely of the path to be followed by the fruit, said brushes forming a supporting apron for said fruit; means for rotating said brushes with the upper faces thereof travelling in a given direction from the fruit receiving end to the fruit discharging end of said apron; and a plurality of bristle retarding members extending into the pathway of peripheral portions of the bristles of each of certain of said brushes, said members being disposed at spaced points about the lower portion of each of said brushes the bristles of which are engaged by said members.

16. In an apparatus for removing surface moisture from fruit or the like, a plurality of rotary brush rolls for supporting and taking up moisture from fruit advanced thereover, means for driving said rolls, and bristle flexing means mounted for engagement with the bristles of said brush rolls whereby to flex said bristles as the brushes rotate and cause collected moisture to be thrown therefrom by the reflex action of said bristles, said bristles flexing means being mounted for cooperation with said brushes to direct the moisture thrown from the brushes downwardly away from the fruit passing thereover.

17. An apparatus for removing moisture from fruit or the like, comprising a plurality of rotary brush rolls positioned for forming a fruit supporting surface, the bristles of said brush rolls being sufficiently rigid and compactly related so as to bear the weight of fruit resting on said surface without substantial distortion of said bristles, means for driving said rolls, and bristle flexing means mounted for engagement with the bristles of said brush rolls to flex said bristles as the brushes rotate and to cause moisture to be thrown from said bristles by reflex action.

18. An apparatus for removing moisture from fruit or the like, comprising a plurality of rotary brush rolls for supporting and taking up moisture from fruit advanced thereover, means for driving said rolls, and bristle flexing means mounted for engagement with the bristles of said brush rolls whereby to flex said bristles as the brushes rotate and cause collected moisture to be thrown from said bristles by their reflex action.

19. In an apparatus for removing moisture from fruit or the like, a rotary brush roll for taking up moisture from fruit subjected to brushing engagement therewith, means for driving said roll, and rotary bristle flexing means rotatable oppositely to said brush roll and mounted for impingement by the bristles thereof, whereby to cause adhering moisture to be thrown from the bristles by their springing action as they pass said bristle flexing means.

20. An apparatus for removing moisture from fruit or the like, comprising a plurality of rotary brush rolls for supporting and taking up moisture from fruit advanced thereover, means for driving said rolls, and bristle flexing means mounted for engagement with the bristles of said brush rolls whereby to flex said bristles as the brushes rotate and cause collected moisture to be thrown therefrom by their reflex action, said bristle flexing means being revoluble oppositely to said brush rolls whereby to minimize wear on the bristles.

21. In an apparatus for removing moisture from fruit or the like, a rotary brush roll for taking up moisture from fruit subjected to brushing engagement therewith, means for driving said roll, and a bristle flexing roll for intercepting the bristles of said brush roll whereby to flex said bristles as the brushes rotate and cause adhering moisture to be thrown therefrom by the reflex action of said bristles, said bristle flexing roll being journalled for rotation oppositely to said brush roll whereby to minimize wear on the bristles.

22. In an apparatus for removing moisture from fruit or the like, a rotary brush roll for taking up moisture from fruit subjected to brushing engagement therewith, means for driving said roll, and a rotary bristle flexing roll mounted for impingement by the bristles of said brush roll whereby to cause adhering moisture to be thrown from the bristles by the springing action of the latter as they pass said roll, and means journalling said bristle flexing roll for free rotation by tractive engagement with said brush roll.

23. An apparatus for removing moisture from fruit or the like, comprising a plurality of rotary brush rolls for supporting and taking up moisture from fruit advanced thereover, means for driving said rolls, and rotary bristle flexing rolls mounted for impingement by the bristles of said brush rolls, whereby to cause adhering moisture to be thrown from the bristles by the springing action of the latter as they pass said bristle flexing rolls, the latter being revoluble oppositely to said brush rolls whereby to minimize wear on the bristles.

24. A method of conveying and scrubbing fresh whole fruit and simultaneously therewith removing free moisture adhering to the exterior surfaces of such fruit, all by a group of cylindrical brushes which comprises arranging said brushes in closely spaced parallelism in a single substantially horizontal plane, rotating said brushes rapidly in the same direction, feeding wet fruit onto said brushes to cause said fruit to be supported on said brushes and progress thereover, momentarily retarding peripheral movement of the bristles of certain of said brushes and then releasing said bristles to flip water from said bristles.

25. A method of conveying and scrubbing fresh whole fruit and simultaneously therewith removing free moisture adhering to the exterior surfaces of such fruit, all by a group of cylindrical brushes which comprises arranging said brushes in closely spaced parallelism in a single substantially horizontal plane, rotating said brushes rapidly in the same direction, feeding wet fruit onto said brushes to cause said fruit to be supported on said brushes and progress thereover, momentarily retarding peripheral movement of the bristles of certain of said brushes when said bristles are disposed downwardly and then releasing said bristles to flip water downwardly from said bristles.

26. An apparatus for removing moisture from rollable articles which comprises: rotary brush means; means for rotating such brush means; means for directing rollable articles over said brush means so that such articles are supported on the bristles of said brush means; and means for retarding and then releasing said bristles, when the latter are not supporting said articles, to flip from said bristles water absorbed by said bristles from said articles.

27. An apparatus for removing moisture from fruit or the like, comprising rotary brush means positioned for forming a fruit supporting surface, the bristles of said brush means being sufficiently rigid and compactly related so as to bear the weight of fruit resting on said surface without substantial distortion of said bristles, means for driving said brush means, and bristle flexing means mounted for engagement with the bristles of said brush means to flex said bristles as the brush means rotates and to cause moisture to be thrown from said bristles by reflex action.

HALE PAXTON.